Figures 1, 2:
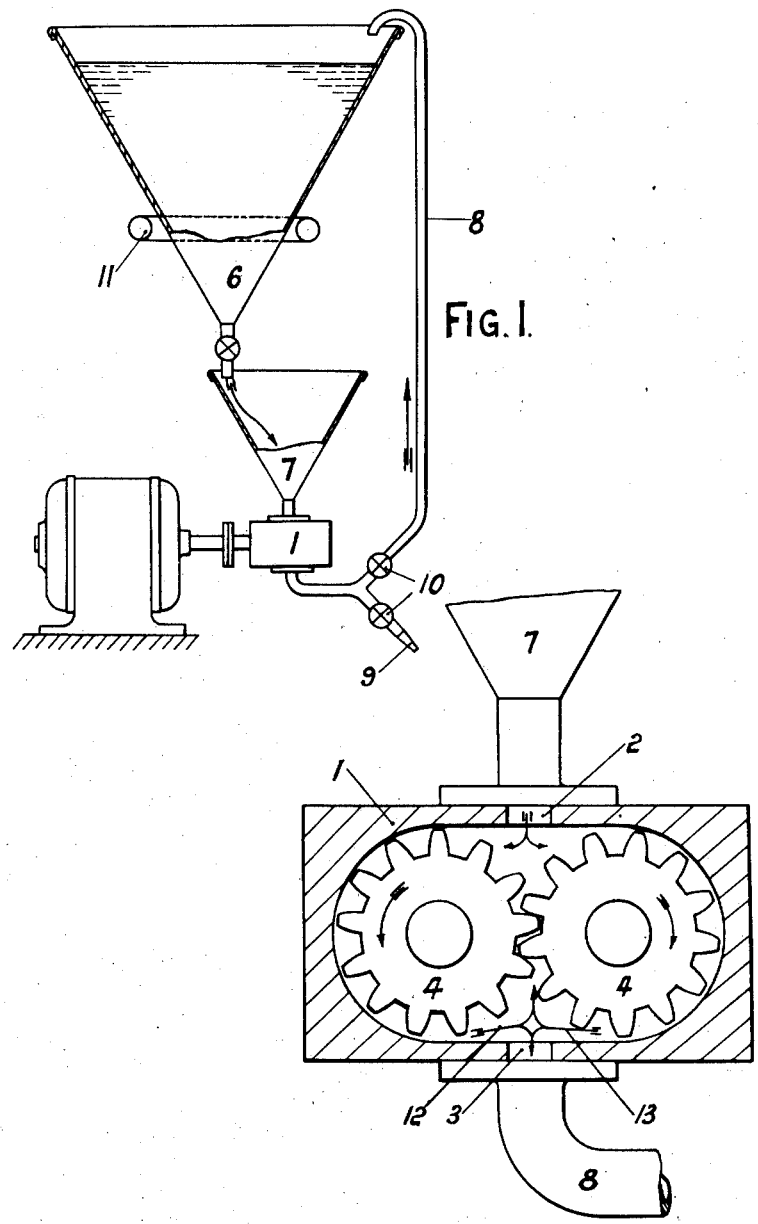

May 29, 1928.

J. McGOUGAN ET AL 1,671,868

MIXING OR EMULSIFYING PROCESS AND APPARATUS

Filed June 26, 1926

Inventors:
John McGougan &
John Hunter,

Patented May 29, 1928.

1,671,868

UNITED STATES PATENT OFFICE.

JOHN McGOUGAN AND JOHN HUNTER, OF GLASGOW, SCOTLAND.

MIXING OR EMULSIFYING PROCESS AND APPARATUS.

Application filed June 26, 1926, Serial No. 118,641, and in Great Britain July 4, 1925.

This invention relates firstly to a process of preparing solutions, or mixtures, or emulsions, such as, for example, a solution of congealed egg yolk and water, a mixture of white lead and linseed oil, or an emulsion of the ingredients of milk, viz:—butter, fat, milk powder and water.

An apparatus designed primarily for the preparation of emulsions by the process of the invention is illustrated in the accompanying drawing in which Fig. 1 is an elevation. Fig. 2 is a section of the pump.

The apparatus shown comprises a gear pump including a casing 1 provided with an inlet port 2 and an outlet port 3 and two intermeshing toothed rotors 4. The port 2 is connected with a vessel constituted by two inter-connectible funnels 6, 7 which receive the ingredients and the port 3 has a return connection constituted by a pipe line 8 to the funnel 6. The flow from the outlet port to the pipe line 8 may be diverted to a delivery nozzle 9 by manipulation of valves 10.

For maintaining the ingredients flowing through the pump at the temperature requisite for effective emulsification, there is fitted to the funnel 6 a heater as at 11.

In the performance of the process of preparing solutions or mixtures or emulsions in accordance with the invention, the ingredients to be converted into solution or mixed or emulsified are passed repeatedly through the pump whereby the ingredients are milled by the squeezing action of each tooth on the suction side of the pump as the tooth approaches the casing 1 and by their passage in the form of fine streams through the clearance spaces between the outer peripheral edges of the teeth and the curved walls of the casing 1. The ingredients are subjected to pressure on the pressure side of the pump and agitated by impingement of the stream indicated by the arrow 12 against the stream indicated by the arrow 13. The ingredients are then brought into a state of intimate comminglement in the region of the seal by the churning action of the teeth of one rotor as they plunge into the interdental spaces of the other rotor and forcibly eject the ingredients from the interdental spaces. Solid components adhering to the teeth are crushed between the teeth as they pass through the seal.

We claim:—

A mixing or emulsifying apparatus comprising a casing having a chamber with inlet and outlet ports, a forcing emulsifier in said chamber, a hopper for delivering the substances to be mixed or emulsified to said chamber, a discharge pipe communicating with said outlet port, said pipe having an extension arranged to deliver the material discharged from said casing to said hopper, a discharge nozzle communicating with said discharge pipe, and valves controlling the passage of the mixed or emulsified material either to said pipe extension or to said discharge nozzle.

In testimony whereof we have signed our names to this specification.

JOHN McGOUGAN.
JOHN HUNTER.